Figure 1:
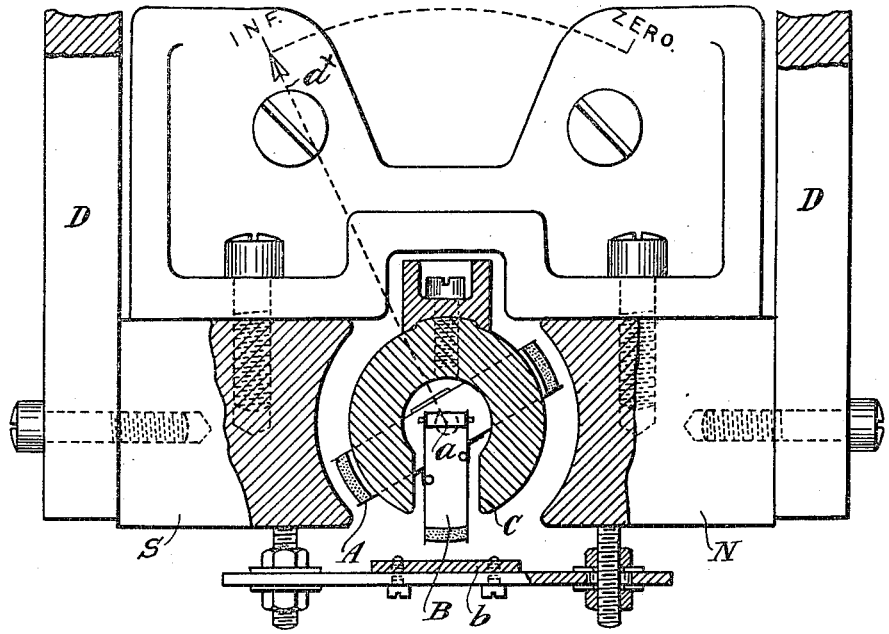

No. 812,196. PATENTED FEB. 13, 1906.
S. EVERSHED.
APPARATUS FOR MEASURING ELECTRIC RESISTANCES.
APPLICATION FILED FEB. 27, 1904.

5 SHEETS—SHEET 1.

WITNESSES

INVENTOR
Sydney Evershed
BY Richards
ATTORNEY

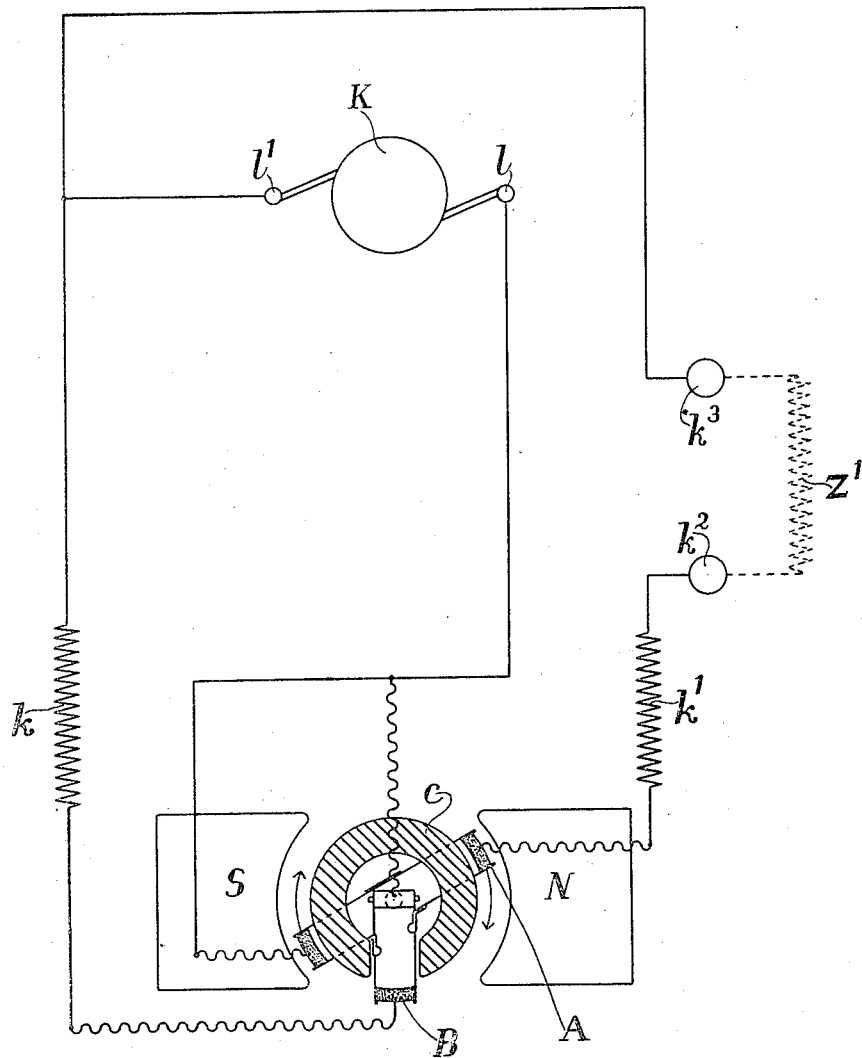
Fig. a.

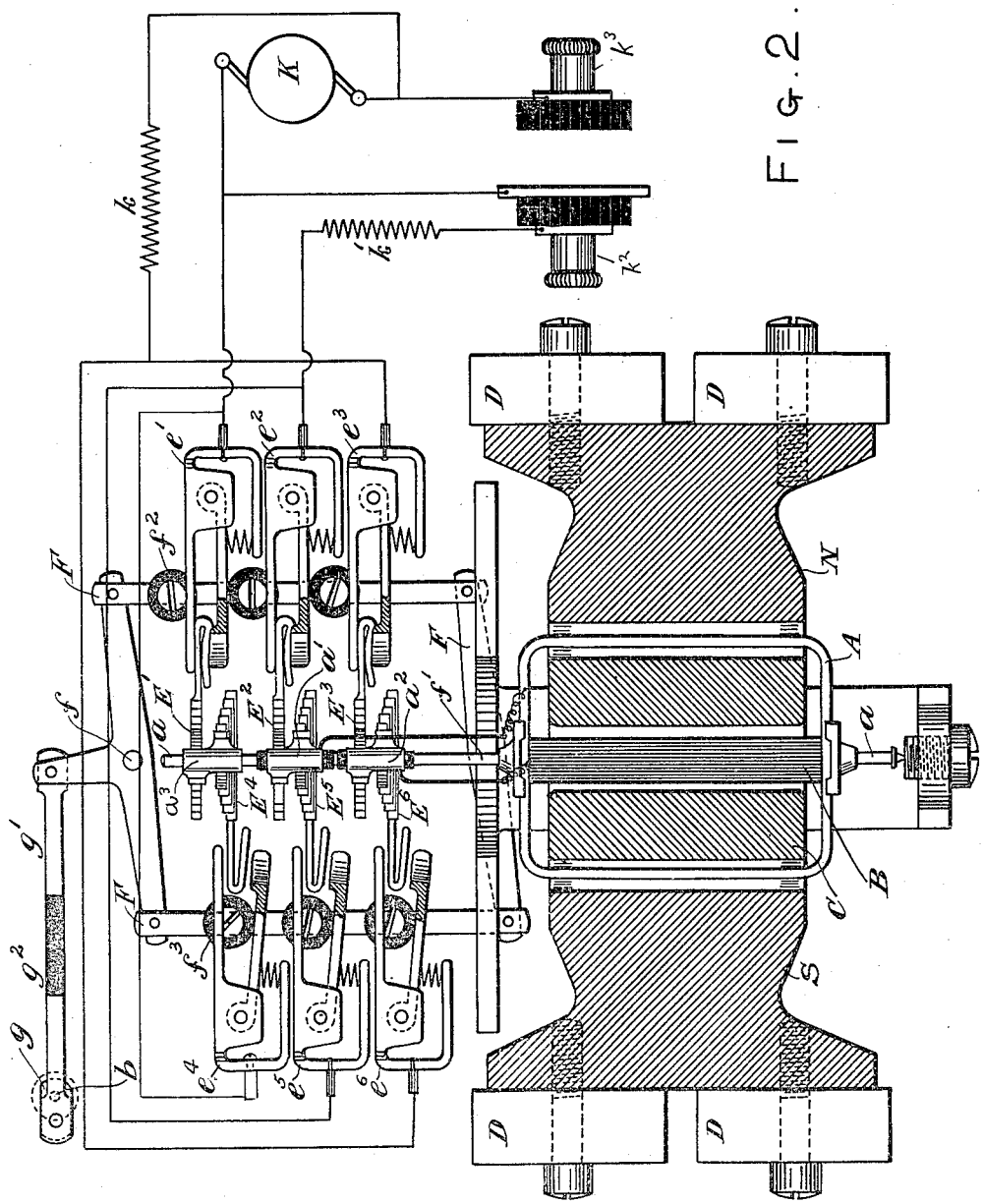

No. 812,196. PATENTED FEB. 13, 1906.
S. EVERSHED.
APPARATUS FOR MEASURING ELECTRIC RESISTANCES.
APPLICATION FILED FEB. 27, 1904.

5 SHEETS—SHEET 4.

WITNESSES

INVENTOR
Sydney Evershed
BY
Richardson
ATTORNEYS

No. 812,196. PATENTED FEB. 13, 1906.
S. EVERSHED.
APPARATUS FOR MEASURING ELECTRIC RESISTANCES.
APPLICATION FILED FEB. 27, 1904.

5 SHEETS—SHEET 5.

WITNESSES
INVENTOR
Sydney Evershed
BY Richardson
ATTORNEYS

UNITED STATES PATENT OFFICE.

SYDNEY EVERSHED, OF STREATLEY, ENGLAND, ASSIGNOR TO HIMSELF, AND EVERSHED AND VIGNOLES LIMITED, OF CHISWICK, ENGLAND, A CORPORATION.

APPARATUS FOR MEASURING ELECTRIC RESISTANCES.

No. 812,196.      Specification of Letters Patent.      Patented Feb. 13, 1906.

Application filed February 27, 1904. Serial No. 195,610.

*To all whom it may concern:*

Be it known that I, SYDNEY EVERSHED, a subject of the King of Great Britain and Ireland, residing at Streatley, in the county of Berks, England, have invented a certain new and useful Improvement in Apparatus for Measuring Electric Resistances, of which the following is a specification.

This invention relates to apparatus used for measuring electric resistance, and particularly insulation resistance, and it is specially applicable as a portable testing set intended for testing and measuring the insulation of electric circuits at voltages commensurate with the working voltage of the circuits. Such testing sets as heretofore known generally comprise a portable hand-dynamo or other convenient source of electric energy and a direct-reading ohmmeter or equivalent instrument for the measurement of resistance. The ohmmeter in such known sets has been of the ordinary type in which fixed coils act upon a moving magnet. This type of instrument has several disadvantages for this particular purpose. The magnetic fields of the coils are necessarily feeble when very high resistances are under test, so that even when the magnet system is made nearly astatic by any of the well-known methods stray magnetic forces are apt to produce errors in the indications of the ohmmeter. Hence if a hand-dynamo is used as the source of current it must be placed at some little distance from the ohmmeter while in use. For this reason the ohmmeter and dynamo have been heretofore fitted in separate boxes or cases, and before they can be brought into use it is necessary to electrically connect the two. The operative forces upon the needle or magnet system of the ohmmeter are feeble even when the coils are formed of an enormous number of turns of the finest procurable wire, so that very delicate pivoting of the moving system is essential to avoid errors due to friction. Testing sets of the type referred to have not been available for testing insulation resistances above about one hundred megohms, because the limit of sensitiveness in the ohmmeters heretofore used has been reached by winding the coils with the finest procurable wire, and it has been impracticable to further increase the operative forces.

The objects of my invention are generally to increase the portability, scope of utility, and convenience of apparatus of the kind specified by the use of ohmmeters or equivalent instruments based upon principles which render their working and indication entirely independent of stray magnetic fields, so that I can not only use my ohmmeter in quite close proximity to the hand-dynamo, but even fix the ohmmeter and dynamo in one box or case, thus greatly increasing the portability and convenience of the apparatus.

A type of instrument entirely unaffected by stray fields is available for the purposes of this invention—namely, the moving-coils type.

This instrument is well known in its application for other purposes; but in applying it for the purpose of this invention I modify and adapt it with special reference to the particular and novel functions it is intended to perform in ways hereinafter described.

It is an essential feature of testing sets of the type hereinafter described that the index of the indicating instrument shall range over a scale in ohms or megohms, and it is to be understood that I make it direct reading in this sense.

Figure 3:
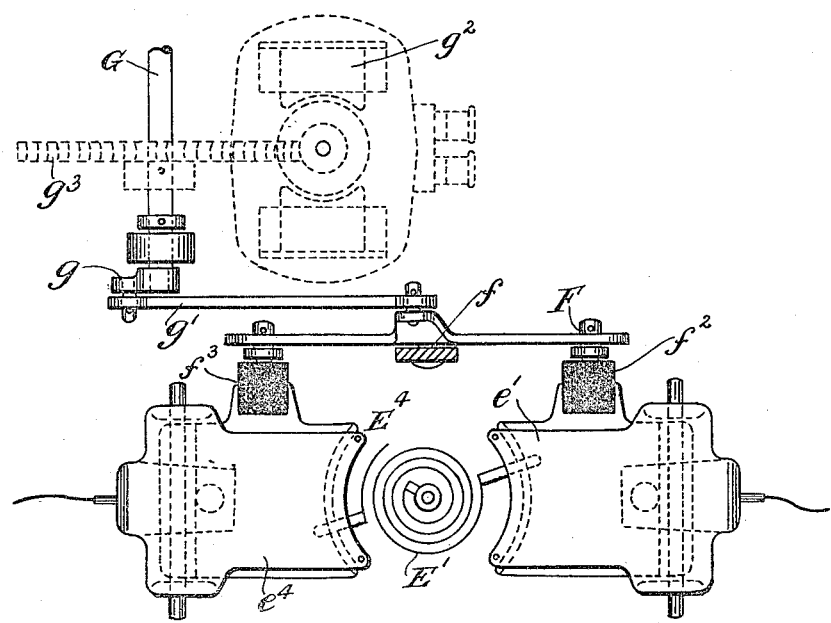
Figure 5:
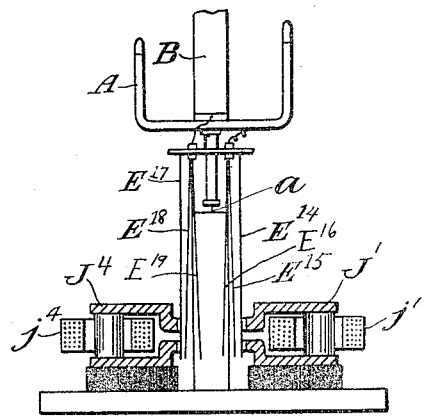
Figure 6:
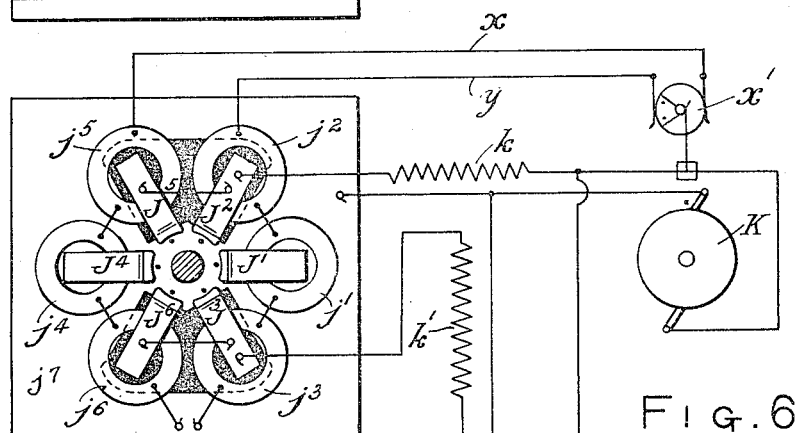
Figure 4:
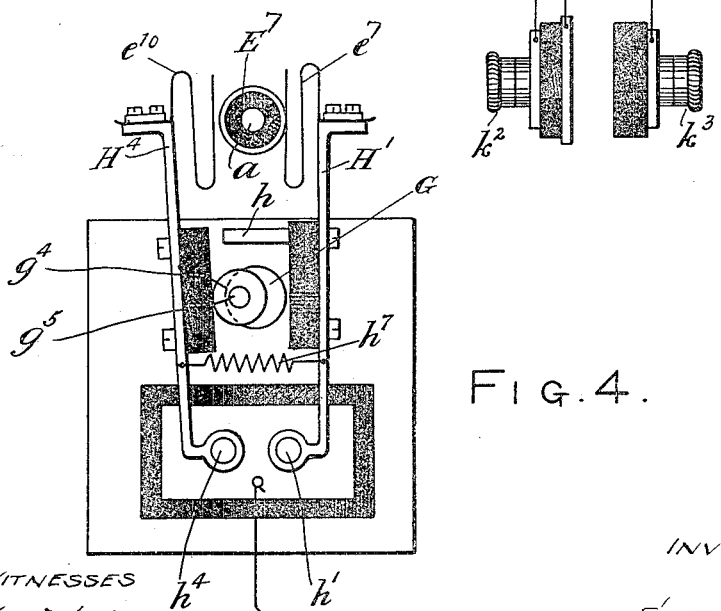
Figure 7:
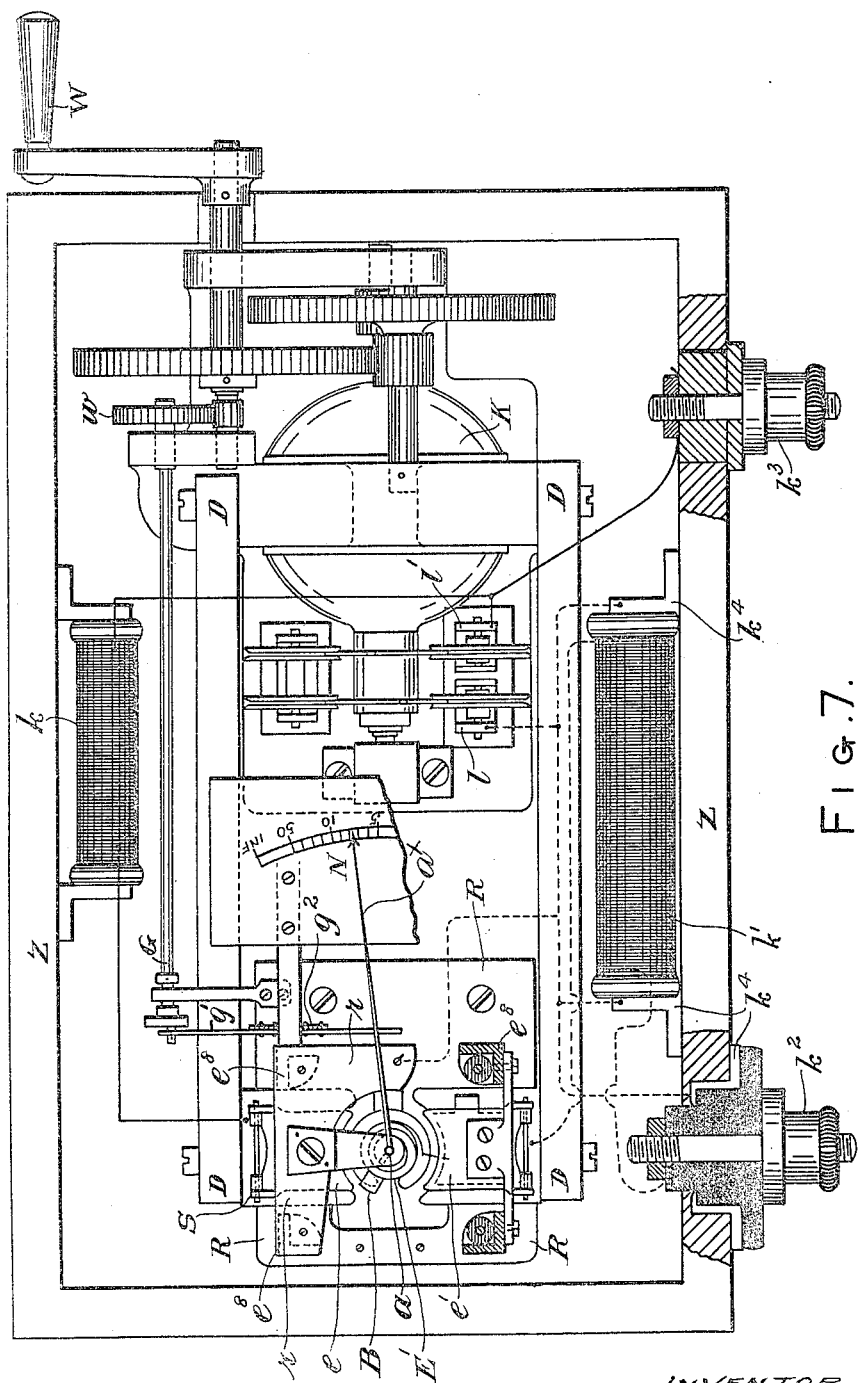

According to this invention a portable testing apparatus well adapted for carrying out tests at moderate pressures is constructed as follows:

Figure 1 shows a preferable arrangement of coils, pole-pieces, and magnetic shield for the moving-coil ohmmeter, detached and on a large scale. Fig. 1ª is a diagram of the electric connections of this apparatus. Fig. 2 is an elevation of the coils of the said ohmmeter and illustrates a preferable form of flexible connections with device for releasing torsion. Fig. 3 is a plan of the said releasing device. Fig. 4 shows an alternative method of connection by spring-brushes with releasing-gear. Fig. 5 shows another alternative method in which the flexible conductors are clamped and released by magnetic attraction. Fig. 6 is a plan of the same. Fig. 7 shows the general arrangement of a combined moving-coil ohmmeter and dynamo.

This instrument is the inverse of the "moving-magnet" ohmmeter and has two movable coils A and B, fixed to an axle carrying a pointer and adapted to rotate in a fixed magnetic field. The angular position of the movable coils being uncontrolled by any mechanical means, the position they will take up will depend solely upon their relative turning moments. The couple tending to deflect the current-coil A will be proportional to the strength of current traversing the unknown resistance Z', while the restoring couple of the pressure-coil B will be proportional to the current flowing in the circuit $l\,B\,k\,l'$ and to a function of the angle the coil makes with the field due to the two poles N S.

When the unknown resistance is infinite, the current in the current-coil being zero, the pressure-coil alone determines the angular position of the movable system and naturally the pressure-coil moves round until it lies with its plane at right angles to the magnetic field, in which position it is shown in the diagram, Fig. 1ª. This position is marked "Infinity" on the dial.

When the unknown resistance is reduced to zero, (short circuit across the terminals $k^2\,k^3$,) the current in the current-coil will be a maximum and will tend to drive it right out of the magnetic field. The resistance $k'$ is inserted to prevent this and to insure a position of stable equilibrium of the movable system when $k^2\,k^3$ are short-circuited. The position so taken up is marked "Zero" on the dial; but it is to be understood that the apparatus is in reality measuring the resistance $k'$. By adjusting the value of $k'$ the zero-point may be brought to any required position upon the dial.

It will be noticed that while both sides of the current-coil are operative, each being on one of the air-gaps of the magnet system, the pressure-coil has only one operative side, the other side being placed at the center of the hollow iron core where no force can act upon it. This is rendered necessary for constructional reasons, as otherwise the second side of the pressure-coil would foul the bracket which serves to support the core. The arrangement and disposition of the pressure-coil is well adapted for the purposes of an ohmmeter, since the coil moves from a position where the field is very weak and nearly uniform to one where it lies within the powerful field within one of the air-gaps. Hence the ohmmeter serves to measure a wide range of resistance upon a single scale without the use of shunts or multiplying devices.

Like letters refer to similar parts and parts of kindred function in the various figures.

According to my invention a testing apparatus well adapted for carrying out tests at moderate pressures is constructed as follows: The instrument for measuring and indicating the resistance under test is an ohmmeter of the moving-coil type, in which the interaction between two movable coils and a fixed magnetic field determines the position of the index upon a dial carrying a suitable scale. This type of indicating instrument tends especially to great sensibility. In my preferable arrangement the coil which is in series with the resistance under test, hereinafter referred to as the "current-coil," moves in the uniform radial magnetic field of a fixed magnet, which is fitted with two pole-pieces and a central core for that purpose, the current-coil being free to rotate in the narrow annular air-gaps between the pole-pieces and the core, as in the well-known moving-coil voltmeters and ammeters. A second coil in series with a shunt-circuit of suitable resistance, hereinafter called the "pressure-coil," is fixed upon the same axis as and at a convenient angle with the current-coil. The currents in the two coils flow in opposite directions, so as to produce opposing forces upon the coils. When the resistance under test is infinite, the current-coil carries no current, and hence the pressure-coil alone determines the angular position of the two coils. Under these circumstances the system comes to rest with the magnetic axis of the pressure-coil in line with or parallel to the magnetic axis of the fixed magnetic field, and for the purpose of my invention so arrange the pole-pieces relatively to the coils that the pressure-coil lies in a weak field outside the air-gaps, and hence if a very small current flows in the current-coil a considerable deflection will take place from infinity. Conversely, at zero the pressure-coil will be in a magnetic field of maximum strength. The current-coil, on the other hand, moves in the uniform field of the annular gaps. These are essential features of my improved ohmmeter to give the required sensitiveness.

When necessary, in order to obtain greater sensitiveness at or near the infinity-mark upon the scale, I still further reduce the strength of the field acting upon the pressure-coil at this position by fixing an iron plate to the framework of the instrument in such a position as to screen the pressure-coil.

In known moving-coil instruments the current is led to and from the coils by means of flexible conductors or by the springs which act as the controlling force. In a moving-coil instrument, used as an ohmmeter, there ought to be no control upon the moving system other than that of the coils themselves, and the effect of even the slight torsion of the flexible conductors is to cause an error in the readings of the instrument. In applying a moving-coil instrument, as an ohmmeter, I therefore provide a novel form of duplex flexible conductors so disposed as to permit of their torsion being entirely removed without at any time breaking the circuits of the instrument. I generally provide three conductors, (each in duplex form.) One serves to carry current to the common terminal of the two coils, and the other two serve to lead the separate currents away again from the pressure-coil and current-coil. Each of these three flexible conductors being double, I provide means for temporarily liberating them, and so releasing the elastic torque or torsion of one conductor out of each of the three pairs. The torsion being thus removed from them, they are once more clamped to the fixed terminals from which they proceed, and the other three conductors are similarly released, and their torsion removed. By successive releasings and clampings of the conductors the whole of the torsion due to the three duplex conductors is finally removed, and hence the coils and index finally come to the true position corresponding with the resistance under test. The alternate releasing and clamping of the flexible conductors is preferably effected by mechanical means operated by hand or otherwise; but I may alternatively use the armature of electromagnets for the same purpose and effect the alternate releasing and clamping by switching the magnets on and off, or I may use steel hairsprings as my duplex flexible conductors and cause the clamping of the springs to take place by the direct attraction of the electromagnets, whose poles will in this modification form the fixed terminals of the moving-coil system. In another modification by which torsionless connections may be made between the moving coils and their fixed terminals the terminal wires of the coils are connected to three slip-rings upon the axle of the movable system, and six elastic collecting-brushes are arranged in contact with the rings, two brushes bearing upon each ring. Means are then provided for alternating, lifting, and replacing the brushes three at a time in an analogous manner to the releasing and clamping of the flexible conductors already described. In this way both the friction-torque and the elastic torque of the brushes may be entirely eliminated.

My testing apparatus is completed by a suitable hand-dynamo designed to furnish continuous currents at the required voltage. The machine described in the specification of United States Patent No. 639,849 is well adapted for the purpose. The ohmmeter and dynamo are both fixed inside the same box in order to reduce the weight of the whole as much as possible. With the same object I make one field-magnet serve both to excite the dynamo and to provide the magnetic field of the ohmmeter, an arrangement which leads to a further considerable reduction in weight. The field-magnet may be either a permanent magnet or an electromagnet. The combination of my improved moving-coil ohmmeter with a dynamo in one box enables me to provide for operating my torsion-releasing mechanism by a cam, crank, or equivalent device upon a suitable spindle geared to the dynamo-spindle, so that the necessary releasing and clamping takes place automatically whenever the dynamo is driven. A further obvious advantage inherent in my combined ohmmeter and dynamo is that the electrical connection between them is made once for all by wires inside the box, and the apparatus is therefore ready for use at any moment without preparation.

In Fig. 1, A is the current-coil, preferably wound on a copper bobbin to damp the oscillations of the instrument. It is mounted on an axle $a$, with indicator-pointer $a^{\times}$ attached. B is the pressure-coil, which has only one side operative, the other passing down a hole in the center of the iron core C. The current-coil moves in the annular air-gaps between the pole-pieces N S and the core C, while the operative side of the pressure-coil moves from a position midway between the horns of the two pole-pieces to a position within the annular air-gap. The necessary magnetic induction is provided by means of magnets D D, which may either be permanent magnets or electromagnets. The coils are shown in the position they occupy when the resistance to be measured being infinite there is no current through the current-coil A, and the system is therefore directed solely by the force upon the pressure-coil B. To obtain sufficient sensitiveness to measure very high resistances, it is necessary to so arrange the pressure-coil with regard to the magnetic field that it may have a very feeble controlling force in the infinity position and a maximum force when the resistance is a minimum. This is secured, according to my invention, by the particular arrangement shown in Fig. 1, and to further increase the sensibility I provide an iron plate $b$, which diminishes the strength of the field in the neighborhood of the operative side of the pressure-coil, more or less, according to the position and dimensions of the plate. Means are provided for adjusting the position of the plate $b$ in order to secure the required sensibility.

In Fig. 2 the pressure-coil B and current-coil A are seen in elevation, the pole-pieces N S and core C being shown in section. One end of the winding of each coil is soldered to the axle $a$ of the current-coil, which forms a common terminal of the coils. The other end of the current-coil A is connected to an insulated sleeve $a'$ upon the axle, to which two flexible conductors or springs $E^2$ and $E^5$ are soldered. Similarly the other end of the pressure-coil B is led to an insulated sleeve $a^2$, to which the springs $E^3$ and $E^6$ are fixed. A third sleeve $a^3$, which is not insulated, but in direct connection with the axle, carries two more flexible conductors $E'$ and $E^4$. The free ends of the flexible conductors are made to project outward radially, three on one side of the axle and three on the opposite side. I find it advantageous to provide some elasticity in the free ends of the springs, which may be conveniently effected by doubling the end back, as shown in Fig. 2. Six spring vises or clamps $e'$, $e^2$, $e^3$, $e^4$, $e^5$, and $e^6$ are so fixed that the six free ends of the springs can be clamped by them. In the drawings the springs $E'$, $E^2$, and $E^3$ are shown tightly clamped by their respective vises, while the jaws of the three vises $e^4$, $e^5$, and $e^6$ being open the corresponding springs $E^4$, $E^5$, and $E^6$ are entirely free from restraint. The alternate clamping and releasing of the flexible conductors are performed by means of a parallel link device F, which oscillates about two centers $f$ and $f'$. The link device carries three insulated rollers $f^2$, which act as tappets to depress the movable jaws of the vises $e'$, $e^2$, and $e^3$. Three similar rollers $f^3$ perform a like function for the vises $e^4$, $e^5$, and $e^6$. The oscillatory motion is imparted to the link device by means of a spindle G, which carries the crank $g$ and connecting-rod $g'$. The arrangement of the electrical circuits is described later in reference to Fig. 6.

In Fig. 3 the arrangement of the releasing device is shown in plan. In this drawing only two of the vises $e'$ and $e^4$ and flexible connectors $E'$ and $E^4$ are shown in order to avoid confusion. The spindle G can be driven in any convenient manner either by hand or otherwise.

In Fig. 3 I show in dotted lines a small electric motor $g^2$ driving the axle G by means of a worm-wheel $g^3$, while in Fig. 7 the axle G is shown connected by gearing $w$ to the winch-axle W of the hand-dynamo which provides the current.

I do not confine myself to the particular form of releasing device shown in Figs. 2 and 3.

Fig. 4 shows an alternative method of effecting the necessary release of torsion and friction. In this modification instead of fixing flexible conductors to the axle of the ohmmeter I provide insulated slip-rings $E^7$, &c., which form the terminals of the coils. One of these, $E^7$, is shown in Fig. 4, and connection with it is alternately made by two spring-brushes $e^7$ and $e^{10}$. These brushes are attached to levers $H'$ and $H^4$, pivoted on centers $h'$ and $h^4$. The necessary oscillating motion is imparted to the levers by means of a roller $g'$, pivoted on an eccentric-pin $g^5$ on any revolving axle G. The brushes $e^7$ and $e^{10}$ are pressed into contact with the slip-ring by means of a suitable spring $h^7$, connecting the levers $H'$ and $H^4$, and the pressure applied to the slip-ring is limited by means of the stop $h^8$.

In Fig. 5 is shown another form of my releasing device in which the flexible conductors $E^{14}$ to $E^{19}$ are alternately clamped and released by the magnetic attraction of electromagnets. In this modification the flexible conductors $E^{14}$ to $E^{19}$ may conveniently consist of thin straight iron wires arranged parallel with the ohmmeter-axle and concentrically disposed around it. Their free ends lie within the circular space formed by the pole-pieces of six electromagnets $J'$ to $J^6$ (Better seen in plan, Fig. 6.) These magnets are mounted upon a metallic plate $j^7$, the magnetic circuits of the magnets $j^2$, $j^3$, $j^5$, and $j^6$ being insulated from the plate $j^7$, while those of the magnets $j'$ and $j^4$ are electrically connected to $j^7$. The coils of these electromagnets are coupled to two circuits $x$ and $y$, the three coils $j'$, $j^2$, and $j^3$ being in connection with circuit $y$ and the other three coils $j^4$, $j^5$, and $j^6$ in connection with the circuit $x$. The magnets $J^3$ and $J^6$ perform the same functions as the vises $e^2$ and $e^5$ in Fig. 2, and they are therefore electrically connected together. The same remark refers to $J^2$ and $J^5$, which correspond to the vises $e^3$ and $e^6$ in Fig. 2, while $J'$ and $J^4$ correspond to the vises $e'$ and $e^4$ in Fig. 2. The currents in the two circuits and two sets of coils are controlled by means of a rotary switch $x'$, which serves to excite first the magnets $J'$, $J^2$, and $J^3$ and then the magnets $J^4$, $J^5$, and $J^6$, thus alternately attracting and fixing three of the flexible conductors and then attracting the other three and liberating the first three. The magnets form the fixed terminals of the ohmmeter-coils, and in order to insure good electrical contact between the flexible conductors and the pole-pieces of the magnets the wires and the pole-pieces may be gilt.

Instead of iron wires I may use any other suitable metal, whether magnetic or not, and attach small pieces of iron to their free ends to serve as armatures to the electromagnets.

The electrical connections of this moving-coil ohmmeter are illustrated in Fig. 1$^a$, Fig. 2, and again in Fig. 6, and the function of the apparatus is common to the different constructions shown. Current is derived from the dynamo K, a resistance $k$ of appropriate value being inserted in the circuit of the pressure-coil, while in series with the current-coil is a resistance $k'$, which serves to adjust the zero position of the index of the instrument to the required point on the dial. An unknown resistance which is to be measured or tested is connected between the terminals $k^2$ and $k^3$. It is to be understood that the vises shown in Figs. 2 and 3 and the corresponding parts in Figs. 4, 5, and 6 are fixed by insulating-supports to a suitable framework, consisting of a lower plate R, an upper plate $r$, and corner angle-pillars, which is shown in Fig. 7.

In order to prevent leakage across the insulators in the ohmmeter from influencing the readings of the instrument, I provide a guard plate or plates in electrical connection with the common terminal of the ohmmeter-coils. This terminal being the source of current, the guard-plates and their connections act in the same way as Price's guard-wire used in submarine cable-testing. I support every insulator of the current-coil circuit in the instrument on a guard-plate so connected. This has the effect of preventing any large potential difference across the insulating-pieces, and therefore eliminating leakage. The principle of the arrangement is well seen in Fig. 7, where the insulator to which $k^2$ is attached and the resistance $k'$ are mounted upon guard-plates $k^4$, which are in the drawings in electrical connection with the common terminal of the ohmmeter-coils, so that this guard-plate performs the same function as the well-known Price's guard-wire used in testing the insulation of cables. It is only necessary to provide guard-plates for the various insulating-pieces which support conductors or terminals in direct connection with the current-coil and its circuit.

In Fig. 7 I show a preferable arrangement of bar-magnets D D, which provide for the induction in the dynamo K and for the field in the ohmmeter. I show permanent magnets; but I may use electromagnets, in which case the exciting-coils may conveniently form part of the resistance $k'$ in series with the pressure-coil. The terminals $k^2$ and $k^3$, to which the circuits or cables to be tested are to be attached, are conveniently placed on one side of the containing box or case Z, and the dial N and index $a'$ are observed through a glazed opening in the top of the box. A scale of ohms or megohms is marked upon the dial, so that the instrument is direct-reading.

Having now described my invention, what I claim, and desire to secure by Letters Patent, is—

1. In combination, a generator of electric current, in close proximity to said generator, a direct-reading moving-coils ohmmeter with two coils, and a portable box inclosing the same for testing electrical resistance.

2. In combination, a generator of electric current; a direct-reading moving-coils ohmmeter in close proximity thereto; means for releasing the torsion of the conductors which convey current to and from the moving coils; and a portable box inclosing the same.

3. In combination, a generator of an electrical current, a direct-reading moving-coils ohmmeter in close proximity thereto; means for releasing the torsion of the conductors which convey current to and from the moving coils; electrically-guarded insulations to avoid leakage; and a portable box inclosing the same.

4. In combination, a hand-operated dynamo; a direct-reading moving-coils ohmmeter in close proximity thereto; duplex flexible conductors to the moving coils of said ohmmeter; fixed clamps adapted to alternately clamp and release the said conductors; means for actuating the clamps; and a portable box inclosing the same.

5. In combination, a direct-reading ohmmeter having moving coils and an index-finger rotatable relatively to fixed magnetic poles; flexible conductors to the moving coils of said ohmmeters; fixed clamps adapted to alternately clamp and release the said conductors; and means for actuating the said clamps.

6. In combination, a generator of electric current; a direct-reading moving-coils ohmmeter in close proximity thereto; guard-plates adapted to support the insulators of the apparatus; connections from the guard-plates to the source of current to prevent leakage; and a portable box inclosing said apparatus.

7. In combination, a generator of electric current; a direct-reading ohmmeter having moving coils and an index finger rotatable relatively to fixed magnetic poles; said coils being connected at one end to the axis of said finger; a pair of flexible conductors connected to the other end of one of the movable coils; a pair of flexible conductors insulated from the said axis and connected to the other end of the other movable coil; six contacts about the said axis adapted to connect said flexible conductors to the line-circuits; and means for closing and releasing the said contacts with the said flexible conductors intermittently.

8. In combination, a hand-operated dynamo; a direct-reading ohmmeter having moving coils and an index-finger rotatable relatively to a fixed magnet; said coils having their common terminal connected with the axis of the said finger; a pair of flexible conductors connected to the said axis; a pair of flexible conductors upon an insulated sleeve of the said axis, and connected to the other end of one of the movable coils; a pair of flexible conductors upon an insulated sleeve of the said axis and connected to the other end of the other movable coil; six contact-clamps arranged about the said axis and adapted to make contact with said flexible conductors; circuits thereto from dynamo and external terminals; and means, operated from the dynamo, for causing the said clamp-contacts to intermittently and alternately make contact with, and release, the said flexible conductors.

In witness whereof I have hereunto set my hand in presence of two witnesses.

SYDNEY EVERSHED.

Witnesses:
 JOHN C. FELL,
 CHARLES CARTER.